United States Patent Office 3,632,667
Patented Jan. 4, 1972

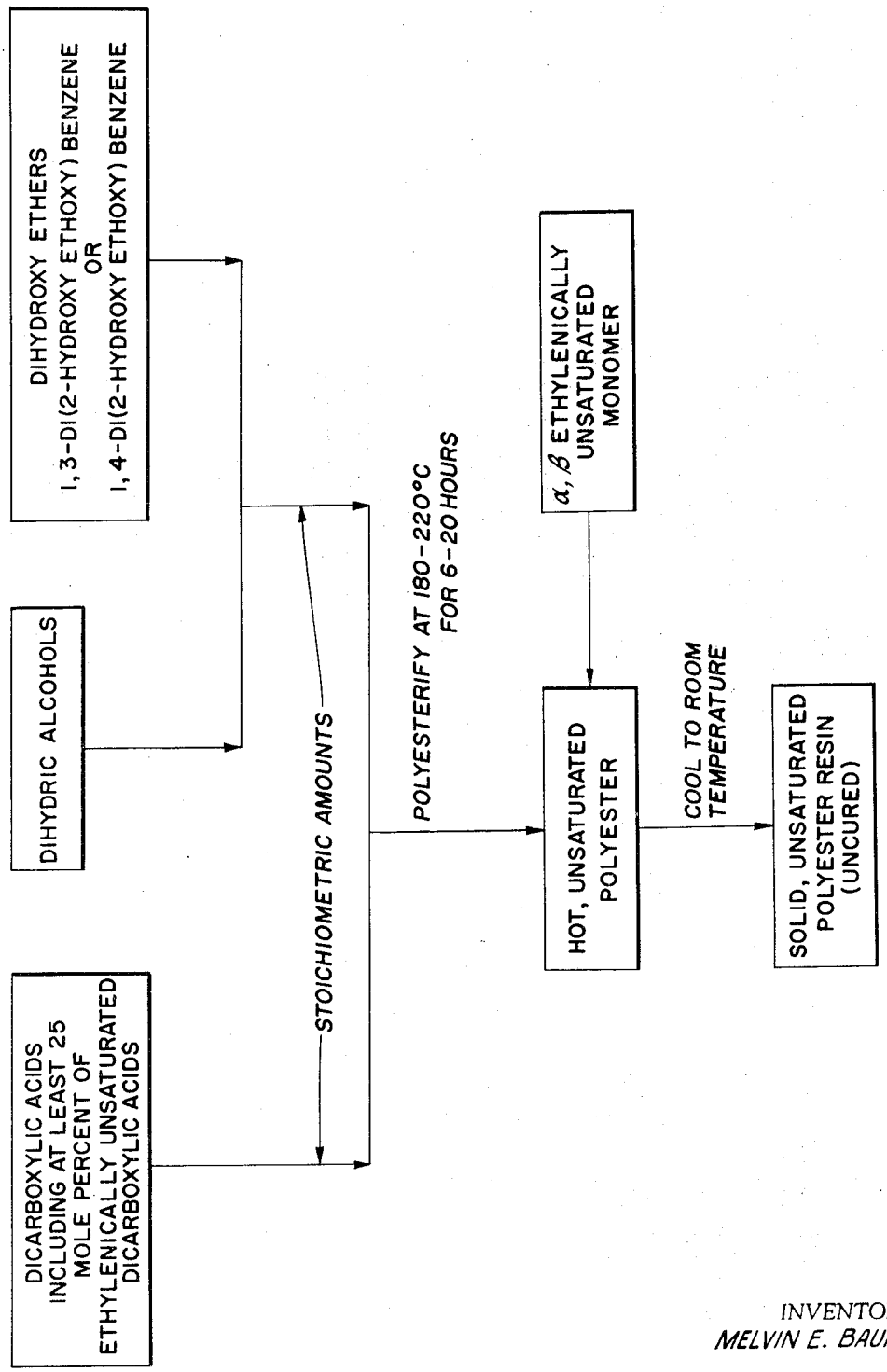

3,632,667
UNSATURATED POLYESTER RESIN MOLDING POWDER
Melvin E. Baum, Monroeville, Pa., assignor to Koppers Company, Inc.
Continuation-in-part of abandoned application Ser. No. 700,311, Dec. 23, 1967. This application May 8, 1970, Ser. No. 35,738
Int. Cl. C08f 21/00, 21/02
U.S. Cl. 260—861     5 Claims

ABSTRACT OF THE DISCLOSURE

An unsaturated polyester resin which is a solid capable of being ground into a free flowing powder at room temperature comprises a mixture of an $\alpha,\beta$-ethylenically unsaturated monomer and a condensation polymer formed by esterifying a dicarboxylic acid, at least a portion of which contains ethylenic unsaturation, with a dihydric alcohol wherein at least a portion of the dihydric alcohol comprises 1,3-di(2-hydroxyethoxy)benzene or 1,4-di(2-hydroxyethoxy)benzene.

CROSS REFERENCE TO RELATED APPLICATION

This application is a continuation-in-part of applicant's copending application Ser. No. 700,311, filed Dec. 23, 1967 now abandoned.

BACKGROUND OF THE INVENTION

Unsaturated polyester resins, which comprise a mixture of an ethylenically unsaturated copolymerizable monomer and a condensation polymer formed by polyesterifying dicarboxylic acids at least a portion of which contains ethylenic unsaturation with dihydric alcohols, can be cured to form thermosetting products which have uses in industry. These resins are particularly useful when glass fibers are dispersed therein as reinforcement. Pipes, panels and the like can be formed from such reinforced thermosetting resins. Although high molecular weight condensation polymers can be formed which are solids at room temperature, the addition of the copolymerizable monomer such as styrene to the polyester results in a liquid; the unsaturated monomer acting as a solvent for the condensation polymer. While it is possible to cross-link an unsaturated polyester molecule with another unsaturated polyester molecule, this is in reality seldom if ever done in commercial practice because of the cost difference between the polyester and the monomer as well as the ease of copolymerizing the unsaturated condensation polymer-monomer mixtures which have enhanced reactivity over the polyester alone. Therefore, the use of unsaturated polyester resins in certain applications such, as for example, in molding applications has been somewhat curtailed by the unavailability of the condensation polymer-monomer mixture as dry powders such as are available in other plastic resins such as phenolics or the like. As a result polyester resins have not been utilized in certain molding techniques and other techniques have had to be modified to allow the use of a liquid.

Quite surprisingly, it has now been discovered that a polyester resin can be formed which is a solid solution at room temperature and therefore, can be ground into a free flowing powder or pelletized or the like. Either 1,3-di(2-hydroxyethoxy)benzene or 1,4-di(2-hydroxyethoxy)benzene is used in forming the initial condensation polymer or unsaturated polyester. The resulting unsaturated polyester can be dissolved while still hot in up to 50% by weight ethylenically unsaturated monomer and when cooled to room temperature, the result is a solid (yet uncured) polyester resin, a solid solution, which can be ground into a free-flowing powder or pelletized. The solid polyester resin solution can be used in molding applications, fluid bed coating techniques, or in impregnation of glass mats.

SUMMARY OF THE INVENTION

In accordance with the invention, an unsaturated polyester resin which is a solid solution at room temperature comprises:

(a) 20 to 60% by total weight of monomer and polymer of an $\alpha,\beta$-ethylenically unsaturated monomer; and (b) 40–80% by total weight of monomer and polymer of a condensation polymer formed by esterifying approximately stoichiometric amounts of:

(1) a dihydric alcohol at least 15 mole percent of which is selected from the class consisting of 1,3-di(2-hydroxyethoxy)benzene and 1,4 - di(2 - hydroxyethoxy) benzene; with
(2) a dicarboxylic acid or anhydride at least a portion of which is an ethylenically unsaturated dicarboxylic acid or anhydride.

BRIEF DESCRIPTION OF THE DRAWING

The drawing is a flow sheet which depicts the process and product of the invention.

DETAILED DESCRIPTION

Unsaturated polyester resins are well known in the art (see, for example, U.S. Pat. 2,255,313, issued to Carleton Ellis). The unsaturated polyester portion is a condensation polymer formed by polyesterifying dicarboxylic acids or anhydrides with dihydric alcohols. The term "unsaturated polyester" as used herein is defined as the condensation polymer produced by condensing dicarboxylic acid or its anhydride with the dihydric alcohol in approximately equimolar proportions and wherein at least a portion of which the dicarboxylic compound contains ethylenic unsaturation. The term "unsaturated polyester resin" as used herein is meant to define the combination of:

(a) the condensation polymer or unsaturated polyester defined above; and
(b) an $\alpha,\beta$-ethylenically unsaturated copolymerizable monomer such as styrene which can be copolymerized with the unsaturated polyester.

To provide unsaturation within the polyester, at least about 25 mole percent of the total dicarboxylic acids or anhydrides must contain ethylenic unsaturation. Examples of such unsaturated dicarboxylic acids include maleic, fumaric, itaconic, aconitic, mesaconic, citraconic, ethylmaleic and dichloromaleic acid. Also the anhydrides of these unsaturated dicarboxylic acids are contemplated by this invention. The remainder of the dicarboxylic acids (up to about 75 mole percent) may be a cyclic dicarboxylic acid or anhydride such as for example: phthalic acid or phthalic anhydride, tetrahydrophthalic acid, hexahydrophthalic acid, trans-1,4-cyclohexane dicarboxylic acid; 1,4- or 1,5- or 2,6- or 2,7-naphthalene dicarboxylic acid, and endo-cis bicyclo(2.2.1)-5-heptene-2,3-dicarboxylic acid. Other dicarboxylic acids suitable in the practice of the invention are straight chain saturated aliphatic dicarboxylic acids, such as for example, succinic acid, glutaric acid, adipic acid, and the like.

The dicarboxylic acids are polyesterified with approximately equimolar amounts of dihydric alcohol. In accordance with the invention, at least 15 mole percent and preferably about 35 mole percent of the dihydric alcohol is either 1,3-di(2-hydroxyethoxy)benzene having the formula:

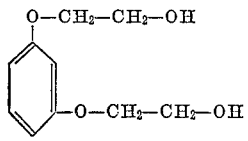

or 1,4-di(2-hydroxyethoxy)benzene having the formula:

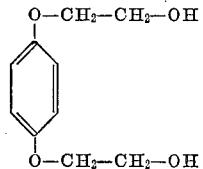

The remainder of the dihydric alcohols can be any of the commonly used alkane diols or oxy alkane diols such as ethylene glycol, propylene glycol, diethylene glycol, dipropylene glycol, 1,3-butane diol, neopentyl glycol or the like as well as saturated cyclic dihydric alcohols such as 1,4-cyclohexane dimethanol, hydrogenated bis-phenol A or the like as well as mixtures of the foregoing.

The polyester is prepared by polyesterifying the ingredients as described above in accordance with the well-known procedures for producing condensation resins such, as for example, described in the Carleton Ellis patent previously referred to. The polyesters may be produced by either the so-called fusion or the solvent process. Optionally present during the polycondensation or polyesterification are esterification catalysts such as tin chloride, zinc chloride, zinc acetate, nickel acetate or cadmium acetate. Also a gelation inhibitor such as hydroquinone or para-tert-butyl-catechol may be added to the polycondensate. The gelation inhibitor inhibits premature polymerization of the unsaturated polyester with the cross linking monomer.

The molecular weight of the polyester is conveniently measured by the acid number of the polyester. This measurement is based on milliequivalents of KOH necessary to neutralize 1 gram of the polyester. For example, when the esterification is carried out by the so-called fusion process, the esterification is carried out under an inert blanket of gas such as nitrogen in a temperature range of about 180°–220° C. for a period of 6–20 hours until an acid number below 100 and preferably below 50 is obtained. Esterification catalysts can be used as well as gelation inhibitors, such as are well known in the art.

While the foregoing has described the formation of the condensation polymer portion of the invention as a single condensation, it is to be understood that the condensation polymer or polyester portion of the invention can also be formed by mixing together more than one polyester. For example, a polyester made by condensing 1,3-di(2-hydroxyethoxy)benzene with maleic anhydride in equimolar proportions can not be hot blended with a second polyester made by condensing propylene glycol with maleic anhydride in equimolar proportions. However, regardless of the manner in which the polyester is formed, the resultant mixture must contain at least about 15 mole percent of the 1,3-di(2-hydroxyethoxy)benzene or 1,4-di(2-hydroxyethoxy)benzene based on the total moles of dihydric alcohol used.

The hot liquid polyester or mixture of polyesters is then dissolved into an α,β-ethylenically unsaturated monomer. The monomer acts both as a solvent for the polyester and as a subsequent copolymerization agent. Examples of such monomers include the vinyl type such as styrene, alpha-methyl styrene, vinyl toluene, divinyl benzene, chlorostyrene, vinyl acetate, vinyl-2-chloroethyl ether, N-vinyl pyrrolidone, and 2-vinyl pyridine.

Also acrylic type cross linking monomers are suitable in the practice of the invention. Examples include methylmethacrylate, methylacrylate, acrylamide, N-tert-butyl-acrylamide, acrylonitrile, hexahydro-1,3,5-triacrylo-s-triazine. In addition allyl derivatives are suitable cross linking monomers. Suitable examples include: diallyl phthalate, diallyl fumarate, allyl diglycol carbonate, and triallyl cyanurate. The resultant solution is then cooled to room temperature. As the solution cools, it solidifies, and the solid solution can be then ground or broken up into pellets. The amount of this monomer may vary. However, at least 10–20% of monomer (by total weight of the resin) must be used to afford a sufficient amount for the subsequent copolymerization or curing of the resin. Greater amounts, however, up to about 60% can be used and are economically attractive to use. However, amounts of monomer above about 60% result in a mixture of solid and liquid. Therefore, use of greater than 60% monomer is not contemplated by the present invention which seeks to produce a solid polyester resin. As will be more clearly illustrated in the examples, some formulations cannot contain as much monomer as can others. The above amount of monomer is, therefore, to be considered as a guideline. In many cases, monomer amounts above 50% are not desirable because a higher amount will result in a solid-liquid mixture. No such considerations of liquids versus solids are normally encountered in the prior art because the prior art polyester monomer mixtures are liquids at room temperature when even only 10–20% monomer is used (the minimum considered necessary to effect adequate copolymerization). However, since the novel polyester resin of the invention provides solid resin which may be used in applications not previously contemplated or feasible for liquid polyester resins, the use of lesser amounts of monomer in certain formulations, so as to obtain a solid resin, is preferred.

The solid resins may have fillers blended in such as calcium carbonate, or talc. Coloring agents such as the iron oxides may also optionally be blended in. Other additives such as fire-retardants also can be incorporated into the resin, particularly if they are solids which can be ground up and physically dispersed into the powdered mixture. Examples of such fire-retardant additives are the combination of hexachlorophene and antimony oxide. Reinforcing materials such as glass fibers can also be blended with the solid resin.

The subsequent copolymerization or curing of the polyester resin is usually initiated by a free-radical generating catalyst such as, for example, a peroxide catalyst; although, other free-radical generating means such as, for example, UV light or radiation can also be used. Examples of such free-radical generating catalyst include benzoyl peroxide, cumene hydroperoxide, methyl ethyl ketone peroxide and the like. Other free-radical generating catalysts which can also be used include, for example, 2,2-azobisisobutyronitrile. Polymerization accelerators such as cobalt compounds or sulfur compounds e.g. cobalt-naphthenate may also be used. A secondary promoter such as dimethyl aniline may also be used in conjunction with the above catalyst.

Some of the above catalysts such as, for example, methyl ethyl ketone peroxide are active at room temperature while others such as, for example, benzoyl peroxide are not active at temperatures below about 60–70° C. Because the invention contemplates that heat can be used during the subsequent copolymerization to melt the solid polyester resin powder back into a liquid, this temperature differential may well influence the selection of the particular catalyst. If a high temperature catalyst, such as, for example, benzoyl peroxide is used, it could be ground up and added to the powdered polyester resin mixture and the mixture shipped with the catalyst already incorporated therein. This is not the normal practice when liquid polyester resins are used because room temperature catalyst would effect the curing immediately and even high temperature catalyst if placed in the liquid polyester resin would initiate premature curing. Therefore, separate packaging of catalysts is usually the practice. With the novel polyester resin of the invention, such can be eliminated and the catalyst incorporated directly into the mixture thus providing one component system which can be directly charged into a mold press and, on application of heat to melt the powder, cured into a thermoset molded object.

Other non-conventional techniques can also be practiced with the solid resin having a dry solid catalyst physically mixed therewith. For example, the catalyst-containing polyester resin powder could be dispersed in a volatile solvent such as acetone or the like just prior to curing. The solvent action of the acetone would bring the resin and catalyst into reactive contact with one another to initiate the copolymerization. The exothermic heat of curing would then drive off the solvent. The solid polyester resin-dry catalyst physical mixture could also be mixed into a liquid polyester resin just prior to cure to provide a thioxotropic mixture. The dry catalyst upon being wetted out by the liquid polyester resin would then initiate cure of the entire resin mixture.

The invention will be more easily understood by referring to the following examples and the attached flow sheet.

EXAMPLE I

Into a reaction vessel, equipped with thermometer, stirrer, reflux condenser, and inert gas inlet tubes was added 1 mole of 1,3-di(2-hydroxyethoxy)benzene, 1 mole of neopentyl glycol and 2 moles of maleic anhydride. The reaction mass was heated, with constant stirring, until a temperature of 220° C. was reached. The water of esterification was removed by a stream of nitrogen gas bubbling through the reactants in the reaction vessel. The heating was continued for 7 hours until an acid number of 13 was reached. Thereupon the hot resin was cut with sufficient styrene to provide a 50–50 weight percent solution. Upon cooling to room temperature, the resin solution was a white solid. This solid was ground to a fine powder and mixed with 2% by weight of ground benzoyl peroxide catalyst. The mixture was charged to a mold cavity in a press and heated to 135° C. for 1 hour to cure the resin. The cured product was a hard, tough, clear casting slightly yellow in color.

EXAMPLE II

To illustrate the difference in result when other dihydric alcohols are used having similar, but not the indentical, structures to the 1,3- and 1,4-di(2-hydroxyethoxy)-benzenes a number of polyesters were prepared by esterifying 1 mole of dihydric alcohol with 1 mole of maleic anhydride under the conditions described in Example I. In each case, the polyester was esterified to an acid number below 50. Each polyester was then dissolved into styrene to a 70% by weight polymer, 30% monomer weight ratio. After allowing the mixtures to cool to room temperature, each was examined. The results are tabulated below.

TABLE I

| Dihydric alcohol in polyester: | Physical state of the polyester resin at room temperature |
|---|---|
| 1,3-di(2-hydroxyethoxy)benzene | Solid |
| 1,4-di(2-hydroxyethoxy)benzene | Solid |
| 1,2-di(2-hydroxyethoxy)benzene | Liquid |
| 2,2'-di(4-hydroxyethoxy phenyl)propane (bis-hydroxy ethyl ether of bis-phenol A) | Liquid |

The results show the difference when other dihydric alcohols are substituted for those of the invention.

EXAMPLE III

Following the esterification procedure of Example I, a number of polyesters were prepared. Portions of the first, a propylene glycol-maleic anhydride unsaturated polyester condensed in 1:1 mole ratio were hot blended respectively in various weight ratios with each of the other unsaturated polyesters. Each of the other unsaturated polyesters comprised a ratio of 2 moles of 1,3-di(2-hydroxyethoxy)benzene to 1 mole of maleic anhydride and 1 mole of a second dicarboxyl acid. Portions of each of these polyester blends were then diluted respectively with sufficient styrene to form 70:30, 60:40, and 50:50 poylester to monomer weight ratios. The physical state of each solution at room temperature is tabulated below:

TABLE IIA

[Second polyester: 1,3-di(2-hydroxyethoxy)benzene maleic anhydride, tetrahydrophthalic anhydride]

| Weight percent of propylene glycol-maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 0 | 100 | 30 | Solid. |
|   |     | 40 | Do. |
|   |     | 50 | Do. |
| 30 | 70 | 30 | Do. |
|    |    | 40 | Do. |
|    |    | 50 | Do. |
| 50 | 50 | 30 | Do. |
|    |    | 40 | Do. |
|    |    | 50 | Do. |
| 60 | 40 | 30 | Do. |
|    |    | 40 | Do. |
|    |    | 50 | Liquid. |
| 70 | 30 | 30 | Do. |
|    |    | 40 | Do. |
|    |    | 50 | Do. |

TABLE IIB

[Second polyester: 1,3-di(2-hydroxyethoxy)benzene maleic anhydride, hexahydrothalic anhydride]

| Weight percent of propylene glycol-maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 0 | 100 | 30 | Solid. |
|   |     | 40 | Do. |
|   |     | 50 | Do. |
| 30 | 70 | 30 | Do |
|    |    | 40 | Do. |
|    |    | 50 | Do. |
| 50 | 50 | 30 | Do. |
|    |    | 40 | Do. |
|    |    | 50 | Do. |
| 60 | 40 | 30 | Do. |
|    |    | 40 | Do. |
|    |    | 50 | Do. |
| 70 | 30 | 30 | Do. |
|    |    | 40 | Do. |
|    |    | 50 | Do. |

TABLE IIC

[Second polyester: 1,3-di(2-hydroxyethoxy)benzene maleic anhydride, isophthalic acid]

| Weight percent of propylene glycol-maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 0 | 100 | 30 | Solid. |
|   |     | 40 | Do. |
|   |     | 50 | Do. |
| 30 | 70 | 30 | Do. |
|    |    | 40 | Do. |
|    |    | 50 | Do. |
| 50 | 50 | 30 | Do. |
|    |    | 40 | Do. |
|    |    | 50 | Do. |
| 60 | 40 | 30 | Liquid. |
|    |    | 40 | Do. |
|    |    | 50 | Do. |
| 70 | 30 | 30 | Do. |
|    |    | 40 | Do. |
|    |    | 50 | Do. |

TABLE IID

[Second polyester: 1,3-di(2-hydroxyethoxy)benzene maleic anhydride, terephthalic acid]

| Weight percent of propylene glycol-maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 0 | 100 | 30 | Solid. |
|   |     | 40 | Do. |
|   |     | 50 | Do. |
| 30 | 70 | 30 | Do. |
|    |    | 40 | Do. |
|    |    | 50 | Do. |
| 50 | 50 | 30 | Do. |
|    |    | 40 | Do. |
|    |    | 50 | Do. |
| 60 | 40 | 30 | Do. |
|    |    | 40 | Liquid. |
|    |    | 50 | Do. |
| 70 | 30 | 30 | Do. |
|    |    | 40 | Do. |
|    |    | 50 | Do. |

TABLE IIE

[Second Polyester: 1,3-di(2-hydroxyethoxy)benzene maleic anhydride, phthalic anhydride]

| Weight percent of propylene glycol-maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 0 | 100 | 30 | Solid. |
|   |     | 40 | Do. |
|   |     | 50 | Do. |
| 30 | 70 | 30 | Do. |
|    |    | 40 | Do. |
|    |    | 50 | Do. |
| 50 | 50 | 30 | Do. |
|    |    | 40 | Do. |
|    |    | 50 | Do. |
| 60 | 40 | 30 | Do. |
|    |    | 40 | Do. |
|    |    | 50 | Do. |
| 70 | 30 | 30 | Do. |
|    |    | 40 | Liquid. |
|    |    | 50 | Do. |

TABLE IIF

[Second polyester: 1,3-di(2-hydroxyethoxy)benzene maleic anhydride, itaconic anhydride]

| Weight percent of propylene glycol-maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 0 | 100 | 30 | Solid. |
|   |     | 40 | Do. |
|   |     | 50 | Do. |
| 30 | 70 | 30 | Do. |
|    |    | 40 | Do. |
|    |    | 50 | Do. |
| 50 | 50 | 30 | Do. |
|    |    | 40 | Do. |
|    |    | 50 | Do. |
| 60 | 40 | 30 | Do. |
|    |    | 40 | Do. |
|    |    | 50 | Liquid. |
| 70 | 30 | 30 | Do. |
|    |    | 40 | Do. |
|    |    | 50 | Do. |

EXAMPLE IV

Following the procedures of Example I, a number of polyesters were prepared using various dihydric alcohols. In each case, the dihydric alcohols were esterified with an equimolar amount of maleic anhydride. One of the polyesters so prepared was the esterification product of maleic anhydride and 1,3-di(2-hydroxyethoxy)benzene. Portions of this polyster were hot blended respectively with varying amounts by weight of each of the other polyesters and then each mixture was diluted with varying amounts by weight of styrene monomer. The physical state of each mixture at room temperatures are recorded as follows:

TABLE IIIA

[Second Polyester: ethylene glycol maleic anhydride]

| Weight percent of 1,3-di(2-hydroxyethoxy)benzene maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 100 | 0 | 30 | Solid. |
|     |   | 40 | Do. |
|     |   | 50 | Do. |
| 70 | 30 | 30 | Do. |
|    |    | 40 | Do. |
|    |    | 50 | Do. |
| 50 | 50 | 30 | Do. |
|    |    | 40 | Do. |
|    |    | 50 | Liquid. |

TABLE IIIB

[Second Polyester: diethylene glycol maleic anhydride]

| Weight percent of 1,3-di(2-hydroxyethoxy)benzene maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 100 | 0 | 30 | Solid. |
|     |   | 40 | Do. |
|     |   | 50 | Do. |
| 70 | 30 | 30 | Do. |
|    |    | 40 | Do. |
|    |    | 50 | Do. |
| 50 | 50 | 30 | Do. |
|    |    | 40 | Do. |
|    |    | 50 | Liquid. |

TABLE IIIC

[Second polyester: propylene glycol maleic anhydride]

| Weight percent of 1,3-di(2-hydroxyethoxy)benzene maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 100 | 0 | 30 | Solid. |
|     |   | 40 | Do. |
|     |   | 50 | Do. |
| 70 | 30 | 30 | Do. |
|    |    | 40 | Do. |
|    |    | 50 | Do. |
| 50 | 50 | 30 | Do. |
|    |    | 40 | Do. |
|    |    | 50 | Do. |
| 40 | 60 | 30 | Do. |
|    |    | 40 | Do. |
|    |    | 50 | Do. |
| 20 | 80 | 30 | Do. |
|    |    | 40 | Do. |
|    |    | 50 | Do. |

TABLE IIID

[Second polyester: dipropylene glycol maleic anhydride]

| Weight percent of 1,3-di(2-hydroxyethoxy)benzene maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 100 | 0 | 30 | Solid. |
|     |   | 40 | Do. |
|     |   | 50 | Do. |
| 70 | 30 | 30 | Do. |
|    |    | 40 | Do. |
|    |    | 50 | Do. |
| 50 | 50 | 30 | Do. |
|    |    | 40 | Do. |
|    |    | 50 | Do. |
| 40 | 60 | 30 | Liquid. |

TABLE IIIE

[Second polyester: 1,3-butylene glycol maleic anhydride]

| Weight percent of 1,3-di(2-hydroxyethoxy)benzene maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 100 | 0 | 30 | Solid. |
|  |  | 40 | Do. |
|  |  | 50 | Do. |
| 70 | 30 | 30 | Do. |
|  |  | 40 | Do. |
|  |  | 50 | Do. |
| 50 | 50 | 30 | Do. |
|  |  | 40 | Do. |
|  |  | 50 | Liquid. |

TABLE IIIF

[Second polyester: neopentyl glycol maleic anhydride]

| Weight percent of 1,3-di(2-hydroxyethoxy)benzene maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 100 | 0 | 30 | Solid. |
|  |  | 40 | Do. |
|  |  | 50 | Do. |
| 70 | 30 | 30 | Do. |
|  |  | 40 | Do. |
|  |  | 50 | Do. |
| 50 | 50 | 30 | Do. |
|  |  | 40 | Do. |
|  |  | 50 | Liquid. |

TABLE IIIG

[Second polyester: 1,4-cyclohexane dimethanol glycol maleic anhydride]

| Weight percent of 1,3-di(2-hydroxyethoxy)benzene maleic anhydride polyester in polyester mixture | Weight percent of second polyester in polyester mixture | Weight percent of styrene in polyester resin (polyester mixture plus monomer) | Physical state of polyester resin at room temperature |
|---|---|---|---|
| 100 | 0 | 30 | Solid. |
|  |  | 40 | Do. |
|  |  | 50 | Do. |
| 70 | 30 | 30 | Do. |
|  |  | 40 | Do. |
|  |  | 50 | Do. |
| 50 | 50 | 30 | Do. |
|  |  | 40 | Do. |
|  |  | 50 | Liquid. |

EXAMPLE V

Following the procedure of Example I, 3 moles of 1,3-di(2-hydroxyethoxy)benzene was esterified with 0.69 mole of tetrabromophthalic anhydride and 2.31 moles of maleic anhydride. Portions of the resultant polyester were diluted while still hot with monomer mixtures respectively of styrene and diallyl phthalate, and styrene and methyl methacrylate. The weight percent of polyester and of each monomer is given below:

TABLE IV

|  | Percent | | | | Physical appearance at room temperature |
|---|---|---|---|---|---|
|  | Polyester | Styrene | Methyl methacrylate | Diallyl phthalate |  |
| 1 | 49 | 21 | 30 | 0 | Off-white, solid. |
| 2 | 49 | 21 | 0 | 30 | Do. |

Thus, the invention provides an unsaturated polyester resin which is a solid at room temperature. The solid unsaturated polyester resin can be ground into fine particles to provide a molding powder which can be used for molding articles in a molding press or the like. The novel solid polyester resin when ground into fine particles, can be physically mixed with dry catalyst powder to form a one-package mixture which will readily cure upon application of heat to melt the powder. Thus, the novel polyester resin of the invention can be utilized in applications where the previous liquid unsaturated polyester resin could not be used.

What is claimed is:
1. An unsaturated polyester resin which is a solid, free-flowing powder at room temperature comprising a solid solution of:
   (a) 20 to 60% by total weight of monomer and polymer of an $\alpha,\beta$-ethylenically unsaturated monomer; and by difference
   (b) 40 to 80% by total weight of monomer and polymer of a condensation polymer formed by esterifying approximately stoichiometric amounts of:
      (i) a dihydric alcohol, at least 15 moles percent (based on total moles of dihydric alcohol) which is a dihydroxy ether selected from the group consisting of 1,3-di(2-hydroxyethoxy)benzene and 1,4-di(2-hydroxyethoxy)benzene; with
      (ii) a dicarboxylic acid or anhydride at least 25 mole percent (based on total moles of dicarboxylic acid) of which is an ethylenically unsaturated dicarboxylic acid or anhydride.

2. The polyester resin of claim 1 wherein the unsaturated dicarboxylic acids are selected from the group consisting of maleic acid, maleic anhydride and fumaric acid.

3. The polyester resin of claim 1 wherein the dihydric alcohols consist essentially of a mixture of propylene glycol and 1,3-di(2-hydroxyethoxy)benzene and the dicarboxylic acids consist essentially of an unsaturated dicarboxylic acid selected from the group consisting of maleic anhydride, maleic acid, fumaric acid, and itaconic acid and a second dicarboxylic acid selected from the group consisting of tetrahydrophthalic acid, hexahydrophthalic acid, isophthalic acid, terephthalic acid and phthalic acid, as well as their anhydrides.

4. The polyester resin of claim 1 wherein the dicarboxylic acid is selected from the group consisting of maleic acid, maleic anhydride, and fumaric acid; the dihydroxy ether is 1,3-di(2-hydroxyethoxy)benzene and the remainder of the dihydric alcohol is selected from the group consisting of ethylene glycol; diethylene glycol; propylene glycol; dipropylene glycol; 1,3-butylene glycol; neopentyl glycol; and 1,4-cyclohexane dimethanol.

5. The polyester resin of claim 1 wherein the $\alpha,\beta$-ethylenically unsaturated monomer is selected from the group consisting of styrene, alpha-methyl styrene, vinyl toluene, divinyl benzene, chlorostyrene, methyl methacrylate, diallyl phthalate, and mixtures thereof.

References Cited

UNITED STATES PATENTS

| 2,456,318 | 12/1948 | Ramler | 260—83 |
| 2,686,164 | 8/1954 | Arvin et al. | 260—22 |
| 2,762,789 | 9/1956 | Wotherspoon et al. | 260—75 |
| 2,973,339 | 2/1961 | Muenster et al. | 260—47 |

OTHER REFERENCES

Caldwell: App'n Ser. No. 26,927, Abstract in 664 O.G. 958 (1952).

Vinogradova et al.: Vysokomol. Soedin., Ser. A 9, 2152–60 (October 1967). (Polymer Ser. U.S.S.R. 2432–42, Chem. Abstr. supplied.)

Stanley: Modern Plastics, 25(12), 103 (1948).

Lawrence: Polyester Resins, Reinhold, New York, 1960 (pp. 24–27 and 88).

Boenig: Unsaturated Polyesters, Elsevier, New York, 1964 (pp. 6 and 166).

Parkyn et al.: Polyesters, vol. 2, Elsevier, New York, 1967 (p. 32).

Bjorksten: Polyesters, Reinhold, New York, 1956 (pp. 115 and 167).

MELVIN GOLDSTEIN, Primary Examiner

U.S. Cl. X.R.

260—40 R, 47 C, 869, 872